US012661861B2

(12) United States Patent
Singh et al.

(10) Patent No.: US 12,661,861 B2
(45) Date of Patent: Jun. 23, 2026

(54) REINFORCEMENT PILLAR ASSEMBLIES AND A METHOD FOR MANUFACTURING SUCH ASSEMBLIES

(71) Applicants: SCITECH CENTRE, Maharashtra Mumbai (IN); ACG PAM PHARMA TECHNOLOGIES PVT. LTD., Mumbai (IN)

(72) Inventors: Karan Singh, Maharashtra (IN); Hans-Werner Bongers, Maharashtra (IN); Sumit Waghmare, Maharashtra (IN); Jagdish Mehta, Mumbai (IN); Farhan Saleem, Maharashtra (IN); Satish Phalke, Mumbai (IN); Omkar Umrani, Mumbai (IN); Mandar Mayank, Maharashtra (IN)

(73) Assignees: ACG PAM PHARMA TECHNOLOGIES PVT. LTD. (IN); SCITECH CENTRE (IN)

( * ) Notice: Subject to any disclaimer, the term of this patent is extended or adjusted under 35 U.S.C. 154(b) by 194 days.

(21) Appl. No.: 18/004,617

(22) PCT Filed: Jun. 10, 2021

(86) PCT No.: PCT/IN2021/050560
§ 371 (c)(1),
(2) Date: Jan. 6, 2023

(87) PCT Pub. No.: WO2022/009217
PCT Pub. Date: Jan. 13, 2022

(65) Prior Publication Data
US 2023/0241851 A1 Aug. 3, 2023

(30) Foreign Application Priority Data
Jul. 8, 2020 (IN) .............................. 202021029061

(51) Int. Cl.
B29D 99/00 (2010.01)
B65B 65/00 (2006.01)

(52) U.S. Cl.
CPC .......... B29D 99/0003 (2013.01); B65B 65/00 (2013.01)

(58) Field of Classification Search
CPC ............................ B29D 99/0003; B65B 65/00
(Continued)

(56) References Cited

U.S. PATENT DOCUMENTS 6,145,257 A * 11/2000 Cappuccio ................ E04C 3/06
52/745.1
2012/0315443 A1 * 12/2012 Woolstencroft ...... E04C 2/3405
156/308.2

FOREIGN PATENT DOCUMENTS

ES 2580903 A1 8/2016
WO 2015136741 A1 9/2015

OTHER PUBLICATIONS

International Search Report; International Application No. PCT/IN2021/050560; International Filing Date—Jun. 10, 2021; Date of Mailing—Sep. 24, 2021; 3 pages.
(Continued)

*Primary Examiner* — Catherine A. Simone
(74) *Attorney, Agent, or Firm* — HAYES SOLOWAY P.C.

(57) ABSTRACT

A reinforcement pillar assembly and a method for manufacturing such assembly for a machine are disclosed. The reinforcement pillar assembly includes a cover panel formed of a polymer material. The cover panel includes an outer surface and an inner surface adapted to face in a direction towards a wall of the machine housing. Further, the reinforcement pillar assembly includes at least one support pillar formed of a metallic material. The at least one support pillar is adapted to be coupled to the cover panel. The at least one support pillar includes a first planar extension and a second (Continued)

planar extension. The first planar extension is adapted to be coupled to the inner surface of the cover panel. The second planar extension is adapted to abut the wall of the machine housing. A gap is defined between the inner surface of the cover panel and the wall of the machine housing.

11 Claims, 8 Drawing Sheets

(58) Field of Classification Search
     USPC .................................................. 428/166, 178
     See application file for complete search history.

(56)                  References Cited

OTHER PUBLICATIONS

Written Opinion of the International Searching Authority; International Application No. PCT/IN2021/050560; International Filing Date—Jun. 10, 2021; Date of Mailing—Sep. 24, 2021; 5 pages.

* cited by examiner

800

THERMOFORMING A SHEET OF A POLYMER MATERIAL TO FORM A COVER PANEL HAVING AT LEAST ONE FLAT PORTION AND A CURVED PORTION ADJACENT TO THE AT LEAST ONE FLAT PORTION — 802

APPLYING AN ADHESIVE MATERIAL ON A REGION OF AT LEAST ONE FLAT PORTION OF THE COVER PANEL — 804

POSITIONING A SUPPORT PILLAR ON THE ADHESIVE MATERIAL APPLIED ON THE AT LEAST ONE FLAT PORTION — 806

REINFORCEMENT PILLAR ASSEMBLIES AND A METHOD FOR MANUFACTURING SUCH ASSEMBLIES

CROSS REFERENCE TO RELATED APPLICATIONS

This application is a National Stage application of PCT/IN2021/050560, filed Jun. 10, 2021, which claims priority to India application No. 202021029061, filed Jul. 8, 2020, and all the benefits accruing therefrom under 35 U.S.C. § 119, the content of which is incorporated by reference in its entirety.

FIELD OF THE INVENTION

The present disclosure relates to reinforcement pillar assemblies and a method for manufacturing such assemblies.

BACKGROUND

With the advancement in manufacturing technology, various techniques are employed to improve the overall aesthetics and constructional aspects of a machine. Generally, the machine includes a housing member adapted to accommodate various sub-components of the machine. The housing member usually encapsulated with a cover assembly which improves the overall aesthetics of the machine and improves handling of the machine. The cover assembly includes various sub-components, such as reinforcement pillars adapted to cover the sharp edges of the housing member. Each of the sub-components is manufactured by performing high precision machining, such as router machining, CNC machining, and high precision milling. This results in a substantial increase in overall time involved in the manufacturing of the reinforcement pillars. Further, the reinforcement pillars have a substantially complex structure which results in a cumbersome task for a worker during servicing of the machine. Owing to the complex structure, the overall cost associated with the manufacturing of the reinforcement pillars is substantially increased.

SUMMARY

This summary is provided to introduce a selection of concepts, in a simplified format, that are further described in the detailed description of the invention. This summary is neither intended to identify key or essential inventive concepts of the invention and nor is it intended for determining the scope of the invention.

In an embodiment of the present disclosure, a reinforcement pillar assembly for a machine is disclosed. The reinforcement pillar assembly includes a cover panel formed of a polymer material. The cover panel includes an outer surface and an inner surface adapted to face in a direction towards a wall of the machine housing. Further, the reinforcement pillar assembly includes at least one support pillar formed of a metallic material. The at least one support pillar is adapted to be coupled to the cover panel. The at least one support pillar includes a first planar extension and a second planar extension. The first planar extension is adapted to be coupled to the inner surface of the cover panel. The second planar extension is adapted to abut the wall of the machine housing. Further, a gap is defined between the inner surface of the cover panel and the wall of the machine housing.

In another embodiment of the present disclosure, a method for manufacturing a reinforcement pillar assembly for a machine housing. The method includes thermoforming a sheet of a polymer material to form a cover panel having at least one flat portion and a curved portion adjacent to the at least one flat portion. Further, the method includes applying an adhesive material on a region of at least one flat portion of the cover panel. Furthermore, the method includes positioning a support pillar on the adhesive material applied on the at least one flat portion. The adhesive material is adapted to couple the support pillar to the cover panel.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

Figure 1:
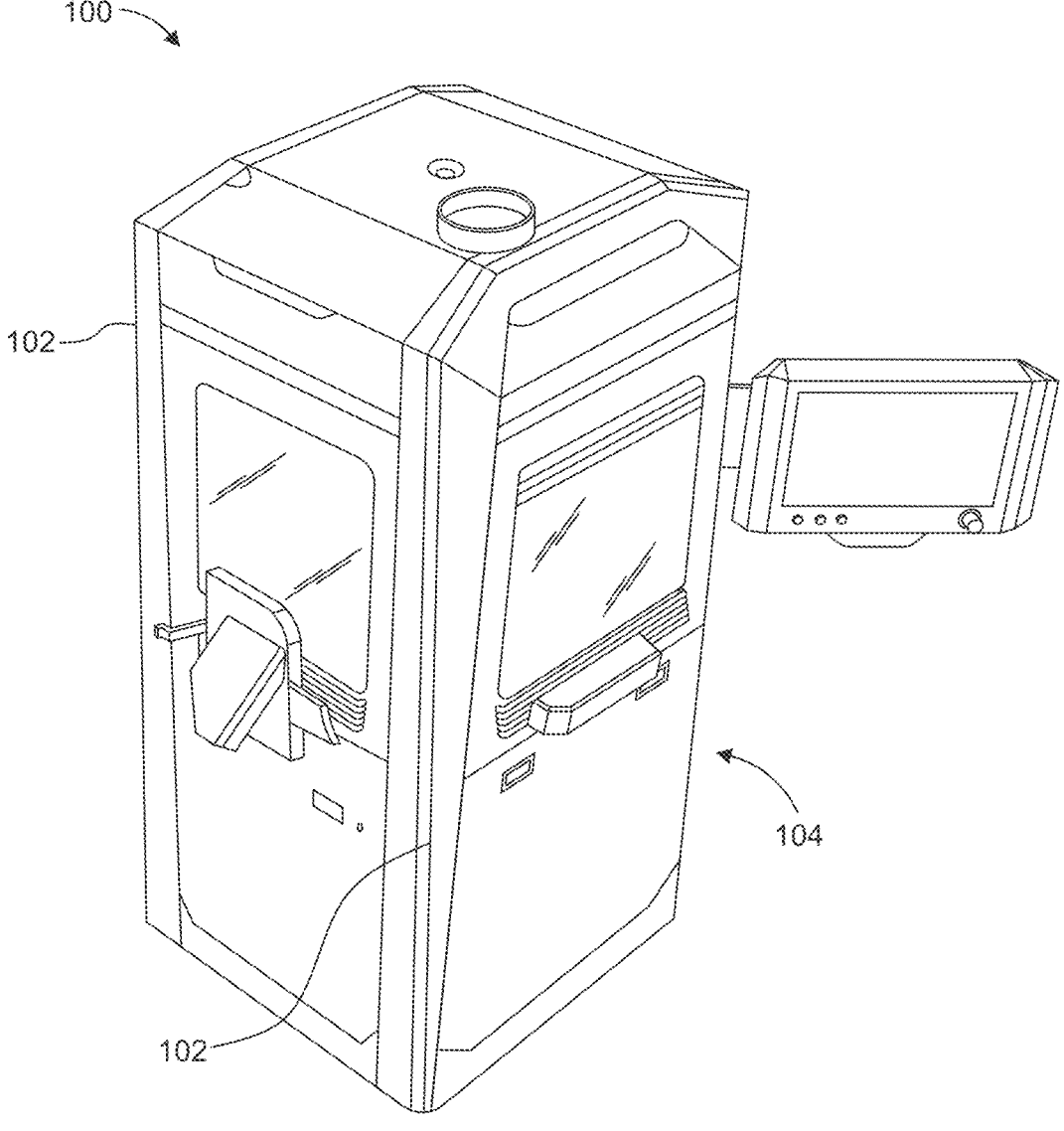
FIG. 1 illustrates a perspective view of an exemplary machine having a reinforcement pillar assembly for a machine housing, according to an embodiment of the present disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF FIGURES

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates. Unless otherwise defined, all technical and scientific terms used herein have the same meaning as commonly understood by one of ordinary skilled in the art to which this invention belongs. The system, methods, and examples provided herein are illustrative only and not intended to be limiting.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and does not limit, restrict or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art.

Reference is made herein to some "embodiments." It should be understood that an embodiment is an example of a possible implementation of any features and/or elements presented in the attached claims. Some embodiments have been described for the purpose of illuminating one or more of the potential ways in which the specific features and/or elements of the attached claims fulfil the requirements of uniqueness, utility and non-obviousness.

Use of the phrases and/or terms such as but not limited to "a first embodiment," "a further embodiment," "an alternate embodiment," "one embodiment," "an embodiment," "multiple embodiments," "some embodiments," "other embodiments," "further embodiment", "furthermore embodiment", "additional embodiment" or variants thereof do NOT necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should NOT be necessarily taken as limiting factors to the attached claims. The attached claims and their legal equivalents can be realized in the context of embodiments other than the ones used as illustrative examples in the description below.

Embodiments of the present invention will be described below in detail with reference to the accompanying drawings.

Figure 2:
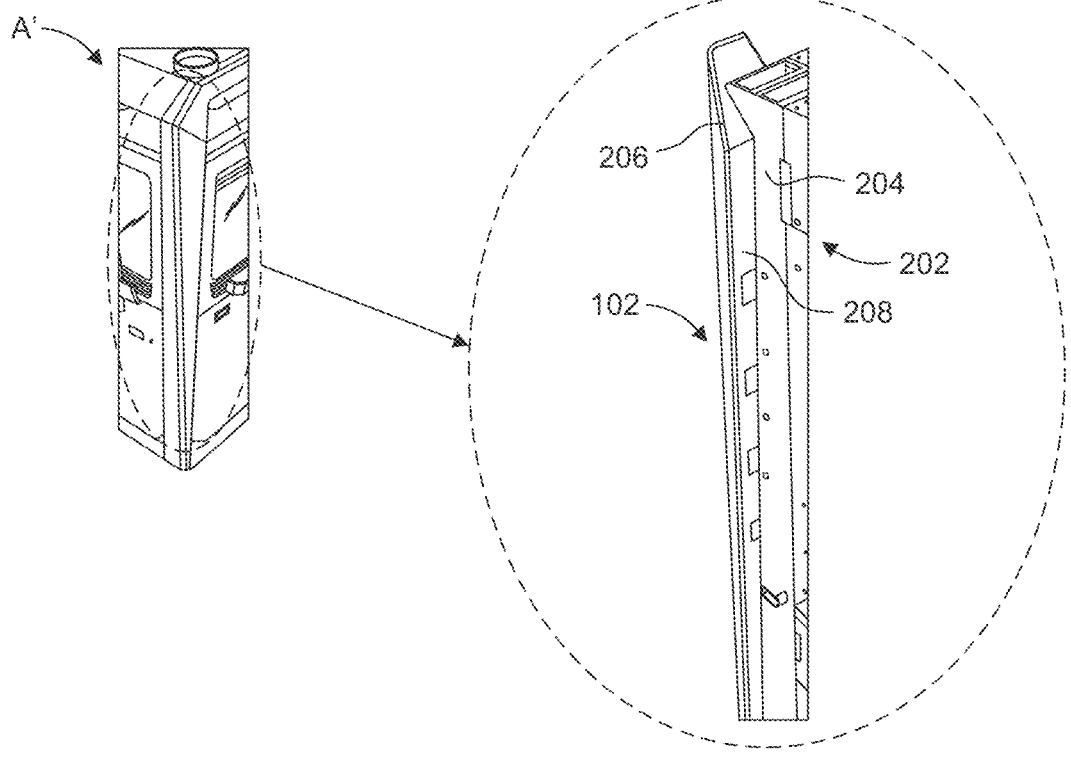
FIG. 2 illustrates a portion A' of the machine depicting a perspective view of the reinforcement pillar assembly for the machine housing, according to an embodiment of the present disclosure.

FIG. 1 illustrates a perspective view of an exemplary machine 100 having a reinforcement pillar assembly 102 for a machine housing, according to an embodiment of the present disclosure. The reinforcement pillar assembly 102 may be employed in a machine 100 to improve the overall aesthetics of the machine 100 and to support an outer casing 104 adapted to cover the machine housing 202 (as shown in FIG. 2). Further, the reinforcement pillar assembly 102 may be employed to cover sharp edges of the machine housing 202, and thereby increasing overall handling of the machine 100. In an embodiment, the reinforcement pillar assembly 102 may be positioned at different locations on the machine housing 202 based on a shape of the machine housing 202 and dimensional characteristics, such as length, width, and height, of the machine housing 202, without departing from the scope of the present disclosure.

The machine 100 may be deployed with a plurality of reinforcement pillar assemblies 102. In the illustrated embodiment, the machine 100 may include four reinforcement pillar assemblies 102 disposed in the vicinity of vertical edges of the machine housing 202. The present disclosure is explained with respect to only one reinforcement pillar assembly 102. However, it should be appreciated by a person skilled in the art that it should not be construed as limiting, and the present disclosure is equally applicable to other reinforcement pillar assemblies 102 of the machine 100.

In an embodiment, the reinforcement pillar assembly 102 may be incorporated in various machines deployed in industries, such as pharmaceutical industries. In the illustrated embodiment, the reinforcement pillar assembly 102 may be employed in a capsule filling machine 100, without departing from the scope of the present disclosure. However, it should be appreciated by a person skilled in the art that it should not be construed as limiting, and the reinforcement pillar assembly 102 is equally applicable to other machines, without departing from the scope of the present disclosure.

Constructional and manufacturing details of the reinforcement pillar assembly 102 are explained in detail in the subsequent sections of the present disclosure.

Figure 3:
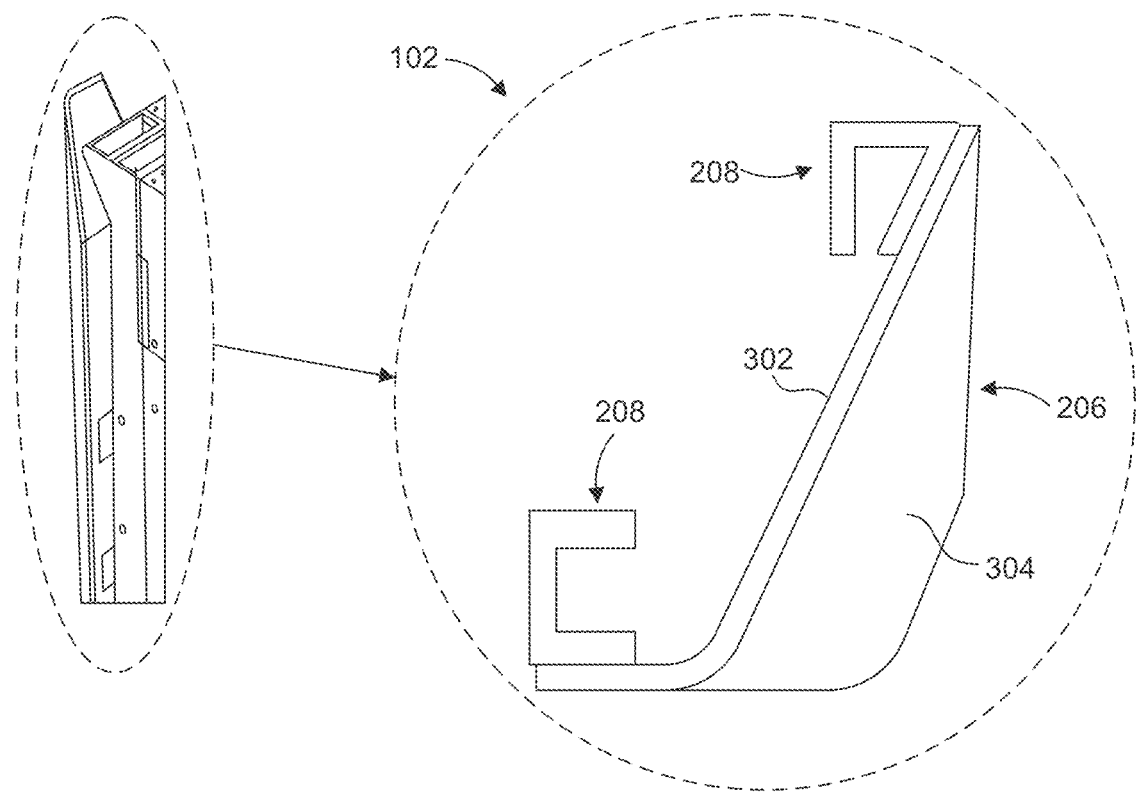
FIG. 3 illustrates a schematic view of the reinforcement pillar assembly, according to an embodiment of the present disclosure.

FIG. 2 illustrates a portion A' of the machine 100 depicting a perspective view of the reinforcement pillar assembly 102 for the machine housing 202, according to an embodiment of the present disclosure. FIG. 3 illustrates a schematic view of the reinforcement pillar assembly 102, according to an embodiment of the present disclosure. Referring to FIG. 1, FIG. 2, and FIG. 3, the reinforcement pillar assembly 102 may be coupled to a wall 204 of the machine housing 202. In an embodiment, the reinforcement pillar assembly 102 may include, but is not limited to, a cover panel 206 and at least one support pillar 208 coupled to the cover panel 206.

Figure 4A:
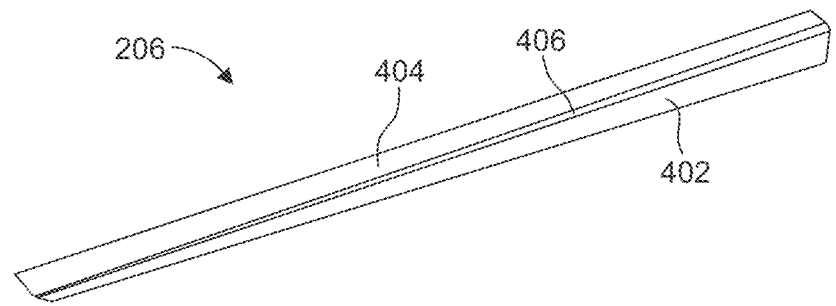
FIGS. 4a and 4b illustrate perspective views of a cover panel of the reinforcement pillar assembly, according to an embodiment of the present disclosure.
Figure 4B:
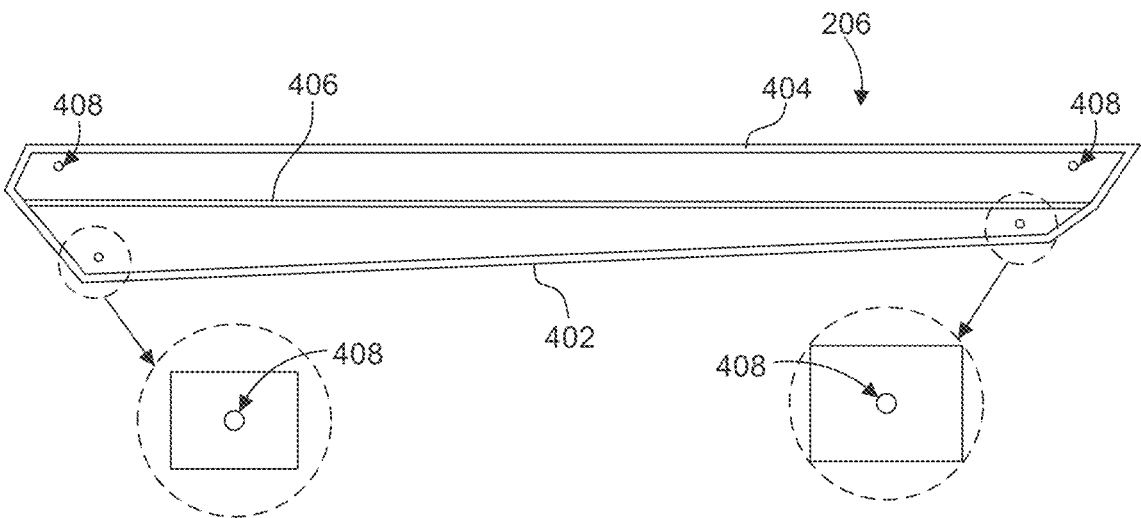

FIGS. 4a and 4b illustrate perspective views of the cover panel 206 of the reinforcement pillar assembly 102, according to an embodiment of the present disclosure. Referring to FIG. 3, FIG. 4a, and FIG. 4b, the cover panel 206 may include, but is not limited to, an inner surface 302 and an outer surface 304 distal to the inner surface 302. The cover panel 206 may be formed of a polymer material, without departing from the scope of the present disclosure. In an embodiment, the cover panel 206 may be formed by using a thermoforming process. The cover panel 206 may have a thickness in a range of 6 mm to 12 mm.

Referring to FIG. 2, FIG. 3, and FIGS. 4a-4b, the cover panel 206 may be referred to as an outermost component of the reinforcement pillar assembly 102. The cover panel 206 may be provided to enhance the aesthetics of the machine 100. The cover panel 206 may be adapted to be attached with the at least one support pillar 208. The cover panel 206 may be supported on the wall 204 of the machine housing 202 through the at least one support pillar 208 which is explained in later sections of the present disclosure. The inner surface 302 of the cover panel 206 may be adapted to face in a direction towards the wall 204 of the machine housing 202.

Figure 5:
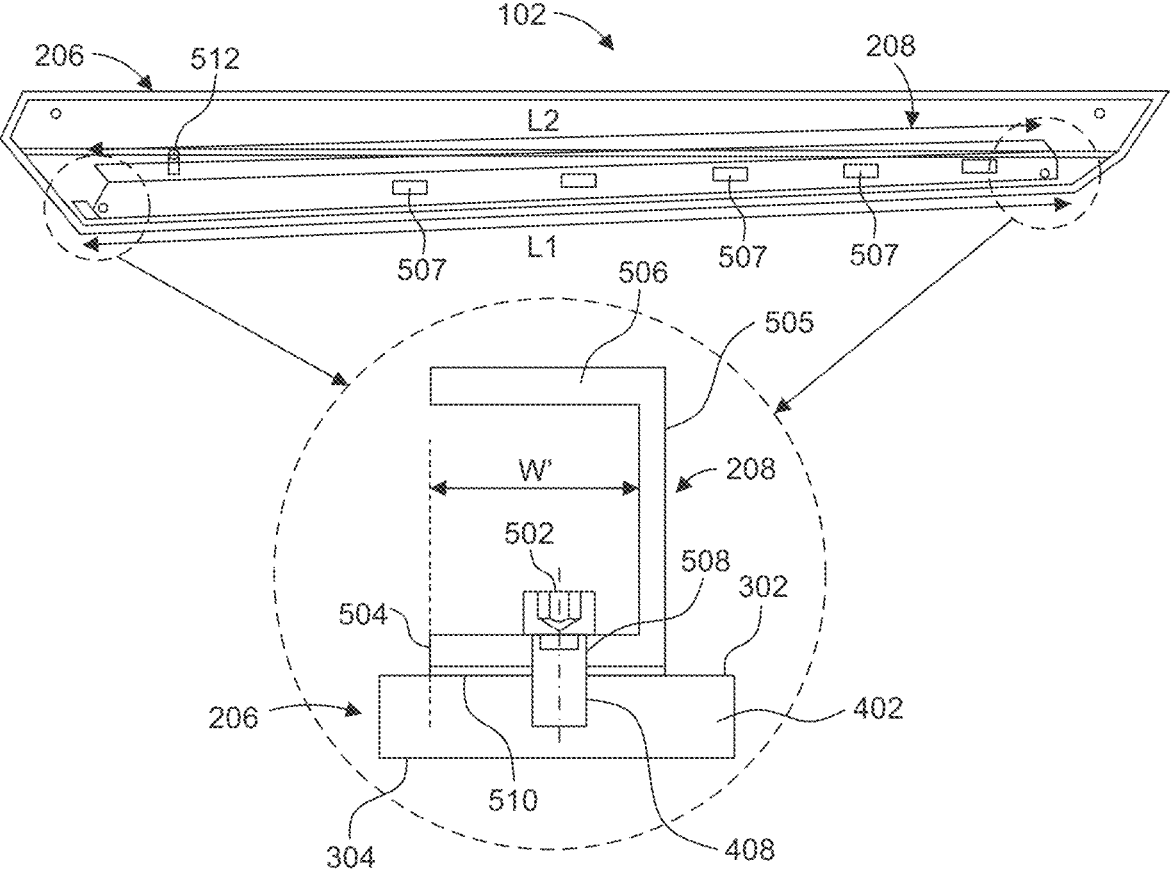
FIG. 5 illustrates a perspective view of the reinforcement pillar assembly depicting the cover panel coupled to at least one support pillar, according to an embodiment of the present disclosure.

FIG. 5 illustrates a perspective view of the reinforcement pillar assembly 102 depicting the cover panel 206 coupled to the at least one support pillar 208, according to an embodiment of the present disclosure. Referring to FIG. 4b and FIG. 5, the cover panel 206 may include, but is not limited to, at least one first flat portion 402, a second flat portion 404, and a curved portion 406 between the first flat portion 402 and the second flat portion 404. Each of the first flat portion 402 and the second flat portion 404 may include a first set of fastening holes 408 adapted to receive a plurality of fasteners 502 (as shown in FIG. 5) to couple the at least one support pillar 208 to the cover panel 206.

Each of the first set of fastening holes 408 may be provided with a threaded bush adapted to receive a fastener from among the plurality of fasteners 502. The threaded bush may be affixed within each of the first set of fastening holes 408 via an adhesive material, such as glue. In an embodiment, the plurality of fasteners 502 may be embodied as one of screws, rivets, and bolts, without departing from the scope of the present disclosure.

For sake of simplicity, FIG. 5 illustrates only one support pillar 208 coupled to the first flat portion 402 of the cover panel 206, and the present disclosure is explained with respect to only one support pillar 208 of the reinforcement pillar assembly 102. However, it should be appreciated by a person skilled in the art that it should not be construed as limiting, and the present disclosure is equally applicable to another support pillar 208 adapted to be coupled to the second flat portion 404 of the cover panel 206, without departing from the scope of the present disclosure.

The at least one support pillar 208 may interchangeably be referred to as the support pillar 208, without departing from the scope of the present disclosure. Further, the support panel 208 may interchangeably be referred to as the support form 208, without departing from the scope of the present disclosure. In an embodiment, the support pillar 208 may be formed of a metallic material. In an example, the support pillar 208 may be formed of one of Stainless Steel (SS) material and Mild Steel (MS) material. The support pillar 208 may have a thickness in a range of 0.8 mm to 3 mm, without departing from the scope of the present disclosure.

As mentioned earlier, the support pillar 208 may be adapted to be coupled to the cover panel 206. Referring to FIG. 5, in the illustrated embodiment, the support pillar 208 may have approximately C-shaped cross-section, without departing from the scope of the present disclosure. In an embodiment, the support pillar 208 may include a first planar extension 504 and a second planar extension 506. The first planar extension 504 may be adapted to be coupled to the inner surface 302 of the cover panel 206. In particular, the first planar extension 504 of the support pillar 208 may be adapted to be coupled to the first flat portion 402 of the cover panel 206. The first planar extension 504 may be aligned along a length 'L1' of the cover panel 206 on the first flat portion 402.

Further, the support pillar 208 may include an intermediate portion 505 disposed between the first planar extension 504 and the second planar extension 506. The support pillar 208 may include a plurality of slots 507 distributed along a length 'L2' of the support pillar 208, The plurality of slots 507 may be formed on the intermediate portion 505 of the support pillar 208. The support pillar 208 may be adapted to be coupled to the machine housing 202 through the plurality of slots 507.

Referring to FIG. 5, in the illustrated embodiment, the first planar extension 504 may include a second set of fastening holes 508 adapted to be aligned with the first set of fastening holes 408 to receive the plurality of fasteners 502. In particular, the first planar extension 504 may be aligned along the length 'L1' of the cover panel 206 on the first flat portion 402 in a manner that the second set of fastening holes 508 may be aligned with the first set of fastening holes 408 formed on the first flat portion 402 of the cover panel 206. The plurality of fasteners 502 may be adapted to be inserted through the second set of fastening holes 508 and simultaneously through the first set of fastening holes 408 to attach the support pillar 208 on the first flat portion 402 of the cover panel 206.

Further, in an embodiment, an adhesive material 510 may be disposed between the inner surface 302 of the cover panel 206 and the first planar extension 504 of the support pillar 208. The adhesive material 510 may be provided to attach the support pillar 208 to the cover panel 206. The adhesive material 510 may be distributed on a region of the inner surface 302 along the length 'L1' of the cover panel 206. In an embodiment, a width of the adhesive material 510 distributed on the region of the inner surface 302 may be approximately equal to a width 'W' of the first planar extension 504 of the support pillar 208 to be attached to the inner surface 302 of the cover panel 206.

The adhesive material 510 may be adapted to couple the first planar extension 504 of the support pillar 208 to the region of the inner surface 302. In an embodiment, the adhesive material 510 may be embodied as a double-sided adhesive tape, without departing from the scope of the present disclosure. The support pillar 208 may be attached to the cover panel 206 via the plurality of fasteners 502 and the adhesive material 510.

Figure 6:
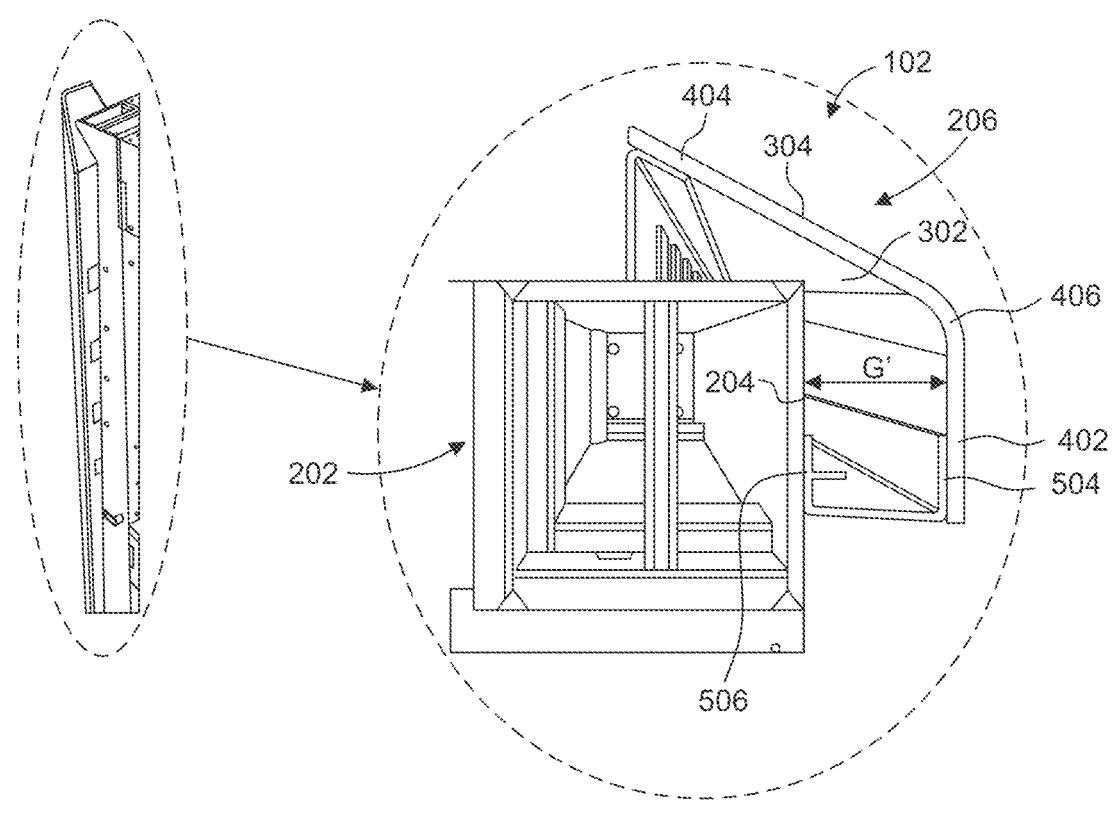
FIG. 6 illustrates an enlarged view of a portion of the machine depicting the reinforcement pillar assembly supported on a wall of the machine housing, according to an embodiment of the present disclosure.

FIG. 6 illustrates an enlarged view of a portion of the machine 100 depicting the reinforcement pillar assembly 102 supported on the wall 204 of the machine housing 202, according to an embodiment of the present disclosure. Referring to FIG. 6, the second planar extension 506 may be adapted to abut the wall 204 of the machine housing 202. The reinforcement pillar assembly 102 may be positioned on the machine housing 202 in the vicinity of a vertical edge of the machine housing 202 in a manner that the second planar extension 506 abuts the wall 204.

Owing to such an arrangement of the support pillar 208 on the cover panel 206 and C-shaped cross-section of the support pillar 208, a gap 'G' may be defined between the inner surface 302 of the cover panel 206 and the wall 204 of the machine housing 202. In an embodiment, the gap 'G' may be directly proportional to a distance between the first planar extension 504 adapted to be coupled to the inner surface 302 and the second planar extension 506 adapted to abut the wall 204 of the machine housing 202. The gap 'G' may allow a flow of air between the machine housing 202 and the reinforcement pillar assembly 102. This substantially maintains the overall temperature of the machine housing 202 during operation of the machine 100.

The reinforcement pillar assembly 102 may be removably positioned on the wall 204 of the machine housing 202. In an embodiment, at least a set of centering fasteners may be provided on the cover panel 206 to align the reinforcement pillar assembly 102 on the wall 204 of the machine housing 102. In such an embodiment, the set of centering fasteners may be provided on the inner surface 302 of the cover panel 206 and adapted to be engaged with the wall 204 to align the reinforcement pillar assembly 102 on the wall in a specific orientation.

In one embodiment, at least one of the cover panel 206 and the support pillar 208 may include a plurality of guiding members 512, hereinafter referred as the locator pins 512, to removably support and align the reinforcement pillar assembly 102 on the wall 204 of the machine housing 202. In such an embodiment, the wall 204 may be provided with a plurality of cavities (not shown) adapted to receive the locator pins 512. For instance, the reinforcement pillar assembly 102 may be positioned on the wall 204 in a manner that the locator pins 512 are accommodated within the plurality of cavities formed on the wall 204 and thereby, supporting the reinforcement pillar assembly 102 on the wall 204.

Such implementation of the guiding pins 512 and corresponding cavities for guiding the reinforcement pillar assembly 102 on the wall 204 assist a user to mount and dismount the reinforcement pillar assembly 102 with ease. For instance, in order to replace the reinforcement pillar assembly 102 with another reinforcement pillar assembly 102, the user can disengage the locator pins 512 of the reinforcement pillar assembly 102 from the plurality of cavities of the wall 204 to dismount the reinforcement pillar assembly 102. Subsequently, the user can mount another reinforcement pillar assembly 102 by engaging the locator pins 512 of the reinforcement pillar assembly 102 with the plurality of cavities formed on the wall 204.

In another embodiment, the wall 204 may be provided with a plurality of guiding pins (not shown) adapted to guide positioning of the reinforcement pillar assembly 102 on the wall 204. In such an embodiment, each of the cover panel 206 and the support pillar 208 may include a plurality of cavities (not shown) adapted to receive the guiding pins. For instance, the reinforcement pillar assembly 102 may be positioned on the wall 204 in a manner that the guiding pins are accommodated within the plurality of cavities formed on the wall 204 and thereby, supporting the reinforcement pillar assembly 102 on the wall 204.

Figure 7:
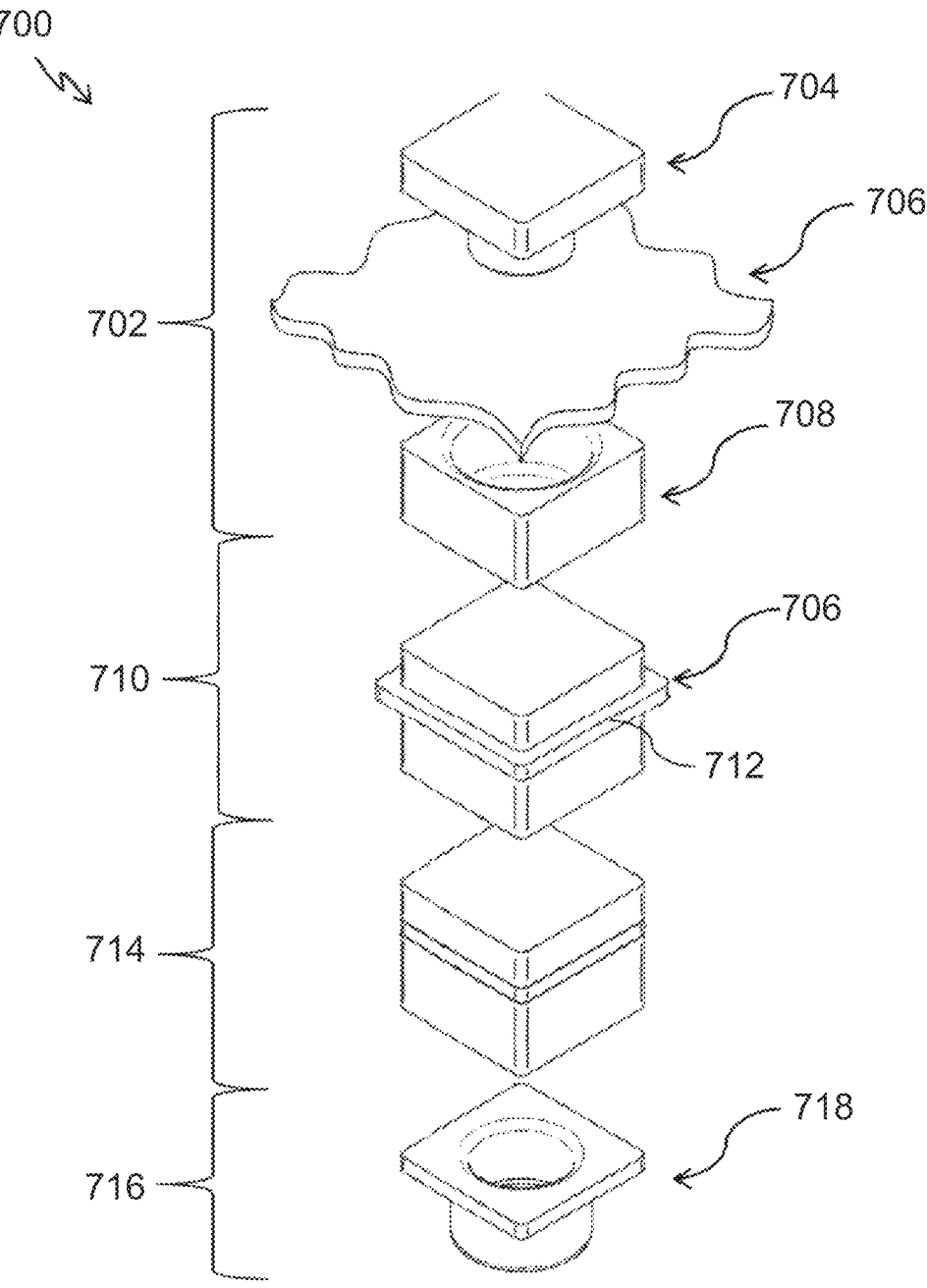
FIG. 7 illustrates an exemplary process of thermoforming for manufacturing the cover panel, according to an embodiment of the present disclosure.

FIG. 7 illustrates an exemplary process 700 of thermoforming for manufacturing the cover panel (206), according to an embodiment of the present disclosure. At step 702, a sheet 704 of the polymer material may be heated at a predefined temperature. In an embodiment, the predefined temperature is a pliable forming temperature selected based on a type of the polymer material. Further, the heated sheet may be positioned in a thermoforming mold including, but is not limited to, a male member 706 and a female member 708. The heated sheet may be positioned between the male member 706 and the female member 708. In an embodiment, each of the male member 706 and the female member 708 conforms with a contour of the cover panel 206.

At step 710, a pre-defined pressure may be applied by the male member 706 to the heated sheet positioned between the male member 706 and the female member 708. In an embodiment, as explained earlier, the male member 706 and the female member 708 conforms with the contour of the cover panel 206 having the first flat portion 402, the second flat portion 404, and the curved portion 406. Further, in an embodiment, a length of each of the male member 706 and the female member 708 may be similar to the length L of the cover panel 206 to be manufactured. Owing to such constructional aspects and arrangement of the heated sheet between the male member 706 and the female member 708, uniform material flow-rate may be achieved during thermoforming process which results in uniform thickness of the first flat portion 402, the second flat portion 404, and the curved portion 406 of the cover panel 206.

At step 714, additional polymer material may be removed from the sheet to form a final product, such as the cover panel 206. Edges 712 of the sheet extruding from thermoforming mold may be trimmed to removed additional polymer material. Further, at step 716, the final product, such as the cover panel 206, may be removed from the thermoforming mold for further processing.

Figure 8:
FIG. 8 illustrates a flowchart depicting a method for manufacturing a reinforcement pillar assembly for the machine housing, according to an embodiment of the present disclosure.
Figure 8:
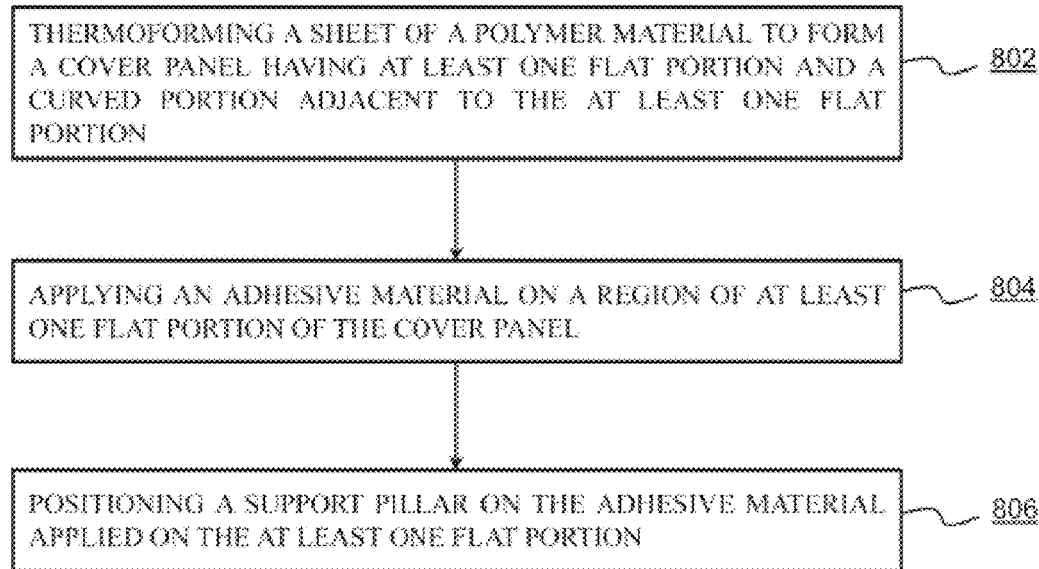

FIG. 8 illustrates a flowchart depicting a method 800 for manufacturing the reinforcement pillar assembly 102 for the machine housing 202, according to an embodiment of the present disclosure. For the sake of brevity, details of the present disclosure that are explained in detail in the description of FIG. 1, FIG. 2, FIG. 3, FIG. 4a, FIG. 4b, FIG. 5, FIG. 6, and FIG. 7 are not explained in detail in the description of FIG. 8.

At step 802, the method 800 includes thermoforming a sheet of a polymer material to form the cover panel 206 having at least one flat portion and the curved portion 406 adjacent to the at least one flat portion. The thermoforming process employed for manufacturing the cover panel 206 of the reinforcement pillar assembly 102 includes, but not limited to, a heating step, a forming step, and a cooling step. Firstly, during the heating step, the sheet of the polymer material may be heated at a predefined temperature, such as a pliable forming temperature. The predefined temperature may depend on the thickness of the sheet used for manufacturing the cover panel 206. In an embodiment, the sheet of the polymer material may be heated at the predefined temperature in a range of 275° F. to 325° F. for a period of 15 minutes to 60 minutes.

Subsequently, during the forming step, the heated sheet may be positioned and clamped on a wooden template having a contour similar to the cover panel 206 to be manufactured. After clamping the sheet on the wooden template, a shape of the sheet may be changed to conform with the contour of the wooden template. In an embodiment, finishing operations, such as a trimming operation, may be performed on the sheet to remove additional material via Computer Numerical Control (CNC) machine. In an embodiment, the finished sheet, i.e., the cover panel 206, may include at least the first flat portion 402, the second flat portion 404, and the curved portion 406 defined between the first flat portion 402 and the second flat portion 404.

At step 804, the method 800 includes applying the adhesive material 510 on the region of at least one flat portion, such as the first flat portion 402 and the second flat portion 404, of the cover panel 206. In an embodiment, the adhesive material 510 may be applied on the region of the inner surface 302 of the cover panel 206 corresponding to the first flat portion 402. The adhesive material 510 may be distributed on the region of the inner surface 302 along the length 'L1' of the cover panel 206. The adhesive material 510 may be adapted to couple the first planar extension 504 of the support pillar 208 to the region of the inner surface 302.

At step 806, the method 800 includes positioning the support pillar 208 on the adhesive material 510 applied on the at least one flat portion, such as the first flat portion 402 and the second flat portion 404. In particular, the first planar extension 504 of the support pillar 208 may be positioned on the applied adhesive material 510 to affix the support pillar 208 to the cover panel 206. Further, the method 800 includes pressing, together, the support pillar 208 and the applied adhesive material 510 on the at least one flat portion of the cover panel 206.

Further, the method 800 includes fastening the support pillar 208 with the cover panel 206 via the plurality of fasteners 502. The adhesive material 510 may be sandwiched between the support pillar 208 and the at least one flat portion of the cover panel 206. The first set of fastening holes 408 may be formed on each of the first flat portion 402 and the second flat portion 404. The first set of fastening holes 408 may be adapted to receive the plurality of fasteners 502 to couple the support pillar 208 to the cover panel 206.

The support pillar 208 may include the first planar extension 504 having the second set fastening holes 508 adapted to be aligned with the first set of fastening holes 408 to receive the plurality of fasteners 502. For instance, the first planar extension 504 of the support pillar 208 may be positioned on the adhesive material applied on the first flat portion 402 such that the second set of fastening holes 508 aligns with the first set of fastening holes 408. Subsequently, the plurality of fasteners 502 may be inserted through the first set of fastening holes 408 and the second set of fastening holes 508 to couple the support pillar 208 with the cover panel 206.

As would be gathered, the present disclosure offers the reinforcement pillar assembly 102 and the method 800 for manufacturing such assembly for the machine housing 202 of the machine 100. As mentioned earlier, the reinforcement pillar assembly 102 can be employed in different machines deployed in various industries including, but not limited to, pharmaceutical industries, food packaging industries, and construction industries. Therefore, the reinforcement pillar assembly 102 has a wide range of applications.

The reinforcement pillar assembly 102 includes the cover panel 206 formed of the polymer material and the at least one support pillar 208 formed of the metallic material. The cover panel 206 is made by performing the thermoforming process on the sheet of the polymer material. The support pillar 208 includes the first planar extension 504 attached to the inner surface 302 of the cover panel 206 and the second planar extension 506 adapted to abut the wall 204 of the machine housing 202. The support pillar 208 may include the second set of fastening holes 508 adapted to be aligned with the first set of fastening holes 408 formed on the cover panel 206.

Further, the adhesive material 510 is applied between the support pillar 208 and the cover panel 206 to affix the support pillar 208 with the cover panel 206. Subsequently, the plurality of fasteners 502 is inserted into the first set of fastening holes 408 through the second set of fastening holes 508 to couple the support pillar 208 with the cover panel 206. Owing to aforesaid construction of the reinforcement pillar assembly 102 and the method of affixing the support pillar 208 and the cover panel 206, the overall complexity of the reinforcement pillar assembly 102 is substantially reduced.

This substantially eliminates the requirement of performing high precision machining on each of the sub-components of the reinforcement pillar assembly 102. This further eliminates extensive time consumption associated with the manufacturing of the reinforcement pillar assembly 102. Therefore, the reinforcement pillar assembly 102 and the method 800 for manufacturing such assembly of the present disclosure is efficient, risk-free, flexible in implementation, cost-effective, convenient, and has a wide range of applications.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

What is claimed is:

1. A reinforcement pillar assembly (102) for a machine housing (202), the reinforcement pillar assembly (102) comprising:

a cover panel (206) formed of a polymer material, wherein the cover panel (206) includes an outer surface (304) and an inner surface (302) adapted to face in a direction towards a wall (204) of the machine housing (202);

at least one support pillar (208) formed of a metallic material and adapted to be coupled to the cover panel (206), wherein the at least one support pillar (208) includes a first planar extension (504) adapted to be coupled to the inner surface (302) of the cover panel (206) and a second planar extension (506) adapted to abut the wall (204) of the machine housing (202);

an adhesive material (510) disposed between the inner surface (302) and the first planar extension (504) of the at least one support pillar (208), wherein a gap (G') is defined between the inner surface (302) of the cover panel (206) and the wall (204) of the machine housing (202).

2. The reinforcement pillar assembly (102) as claimed in claim 1, wherein the cover panel (206) includes at least a first flat portion (402), a second flat portion (404), and a curved portion (406) defined between the first flat portion (402) and the second flat portion (404), wherein the cover panel (206) is formed by using a thermoforming process.

3. The reinforcement pillar assembly (102) as claimed in claim 2, wherein each of the first flat portion (402) and the second flat portion (404) includes a first set of fastening holes (408) adapted to receive a plurality of fasteners (502) to couple the at least one support pillar (208) to the cover panel (206).

4. The reinforcement pillar assembly (102) as claimed in claim 3, wherein the first planar extension (504) of the at least one support pillar (208) includes a second set of fastening holes (508) adapted to be aligned with the first set of fastening holes (408) to receive the plurality of fasteners (502), wherein the at least one support pillar (208) is formed of one of Stainless Steel (SS) material and Mild Steel (MS) material.

5. The reinforcement pillar assembly (102) as claimed in claim 1, wherein the adhesive material (510) is distributed on a region of the inner surface (302) along a length (L') of the cover panel (206), the adhesive material (510) is adapted to couple the first planar extension (504) of the at least one support pillar (208) to the region of the inner surface (302).

6. The reinforcement pillar assembly (102) as claimed in claim 1, wherein the cover panel (206) has a thickness in a range of 6 mm to 12 mm and the at least one support pillar (208) have a thickness in a range of 0.8 mm to 3 mm.

7. The reinforcement pillar assembly (102) as claimed in claim 1, wherein the at least one support pillar (208) includes a plurality of slots (507) distributed along a length (L2) of the at least one support pillar (208), wherein the at least one support pillar (208) is adapted to be coupled to the machine housing (202) through the plurality of slots (507).

8. The reinforcement pillar assembly (102) as claimed in claim 1, wherein the gap 'G' is adapted to allow a flow of air between the machine housing (202) and the reinforcement pillar assembly (102).

9. The reinforcement pillar assembly (102) as claimed in claim 1, wherein at least a set of centering fasteners is provided on the inner surface (302) of the cover panel (206) to align the reinforcement pillar assembly (102) on the wall (204) of the machine housing (102).

10. The reinforcement pillar assembly (102) as claimed in claim 1, wherein the wall (204) is provided with a plurality of cavities and at least one of the cover panel (206) and the support pillar (208) include a plurality of guiding members, each of the plurality of cavities is adapted to receive the plurality of guiding members to removably support and align the reinforcement pillar assembly (102) on the wall (204).

11. The reinforcement pillar assembly (102) as claimed in claim 1, wherein the wall (204) is provided with a plurality of guiding members and at least one of the cover panel (206) and at least one support pillar (208) includes a plurality of cavities, each of the guiding members is adapted to be accommodated within the plurality of cavities to removably support and align the reinforcement pillar assembly (102) on the wall (204).

* * * * *